(12) United States Patent
Azuma et al.

(10) Patent No.: US 12,266,389 B2
(45) Date of Patent: Apr. 1, 2025

(54) MAGNETIC DISK SUBSTRATE, MAGNETIC DISK, ANNULAR-SHAPED SUBSTRATE, AND METHOD FOR MANUFACTURING MAGNETIC DISK SUBSTRATE

(71) Applicant: HOYA CORPORATION, Tokyo (JP)

(72) Inventors: Shuhei Azuma, Hung Yen Province (VN); Toshio Takizawa, Akishima (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 18/547,572

(22) PCT Filed: Feb. 24, 2022

(86) PCT No.: PCT/JP2022/007710
§ 371 (c)(1),
(2) Date: Aug. 23, 2023

(87) PCT Pub. No.: WO2022/181715
PCT Pub. Date: Sep. 1, 2022

(65) Prior Publication Data
US 2024/0135970 A1  Apr. 25, 2024
US 2024/0233764 A9  Jul. 11, 2024

(30) Foreign Application Priority Data

Feb. 24, 2021  (JP) ................ 2021-027888

(51) Int. Cl.
*G11B 5/73*  (2006.01)
*G11B 5/82*  (2006.01)
*G11B 5/84*  (2006.01)

(52) U.S. Cl.
CPC ........... *G11B 5/73921* (2019.05); *G11B 5/82* (2013.01); *G11B 5/84* (2013.01)

(58) Field of Classification Search
None
See application file for complete search history.

(56) References Cited

U.S. PATENT DOCUMENTS 5,521,781 A * 5/1996 Kaneko ................ G11B 5/8404
  216/2
2002/0197437 A1 * 12/2002 Hashimoto ........ G11B 5/73921
  428/848.6

(Continued)

FOREIGN PATENT DOCUMENTS

JP  2004273030 A  9/2004
JP  2006040361 A  2/2006

(Continued)

OTHER PUBLICATIONS

Translation of the International Search Report mailed on May 17, 2022.

*Primary Examiner* — Kevin M Bernatz
(74) *Attorney, Agent, or Firm* — Global IP Counselors, LLP

(57) ABSTRACT

A magnetic-disk substrate according to an embodiment includes two main surfaces and an outer circumferential edge surface. In the magnetic-disk substrate, the outer circumferential edge surface includes two chamfered surfaces that are respectively connected to the main surfaces, and a side wall surface that is curved and extends to protrude outward between the two chamfered surfaces. The side wall surface has a radius of curvature of 1100 μm or more on a cross-section of the magnetic-disk substrate extending along a plate thickness direction of the magnetic-disk substrate.

18 Claims, 5 Drawing Sheets

(56) References Cited

U.S. PATENT DOCUMENTS

| | | | |
|---|---|---|---|
| 2006/0018052 A1* | 1/2006 | Kawai | G11B 5/73921 |
| 2007/0196699 A1* | 8/2007 | Aida | B24B 9/065 |
| | | | 428/848.6 |
| 2015/0262604 A1 | 9/2015 | Takahashi et al. | |
| 2018/0174606 A1* | 6/2018 | Azuma | G11B 5/8404 |

FOREIGN PATENT DOCUMENTS

| | | | |
|---|---|---|---|
| JP | 2009173295 A | 8/2009 | |
| JP | 2010238302 A | 10/2010 | |
| JP | 5574392 B1 | 8/2014 | |

* cited by examiner

[Fig. 1]
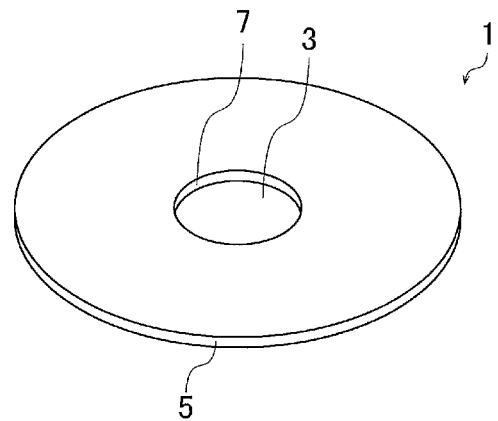
[Fig. 2]
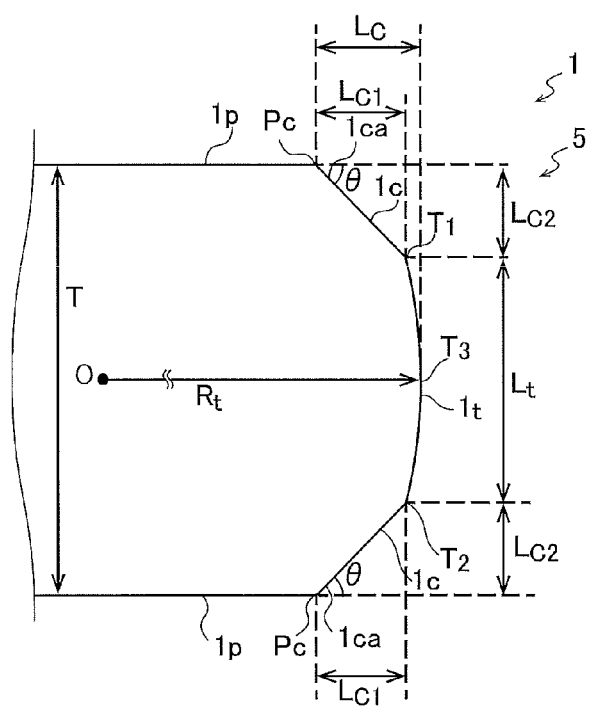

[Fig. 3]
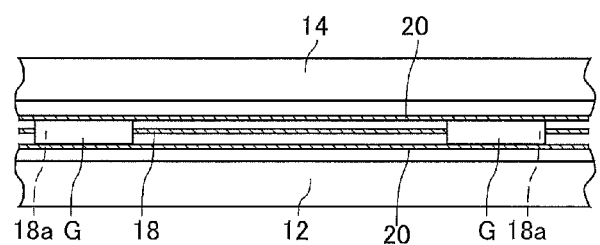
[Fig. 4]
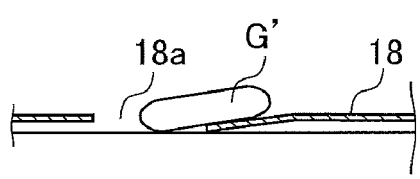

[Fig. 5]
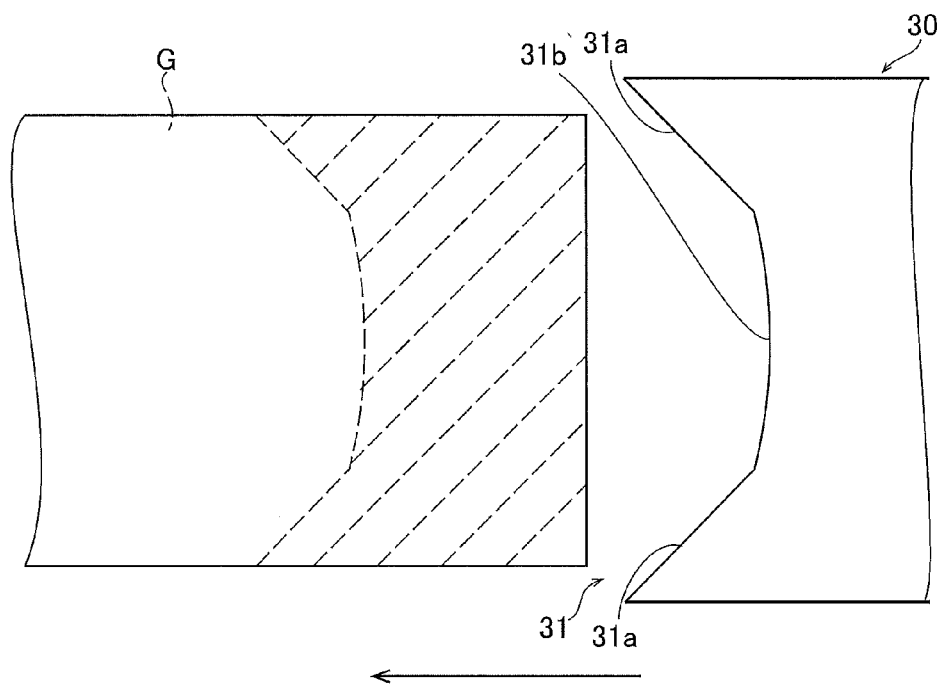

[Fig. 6]
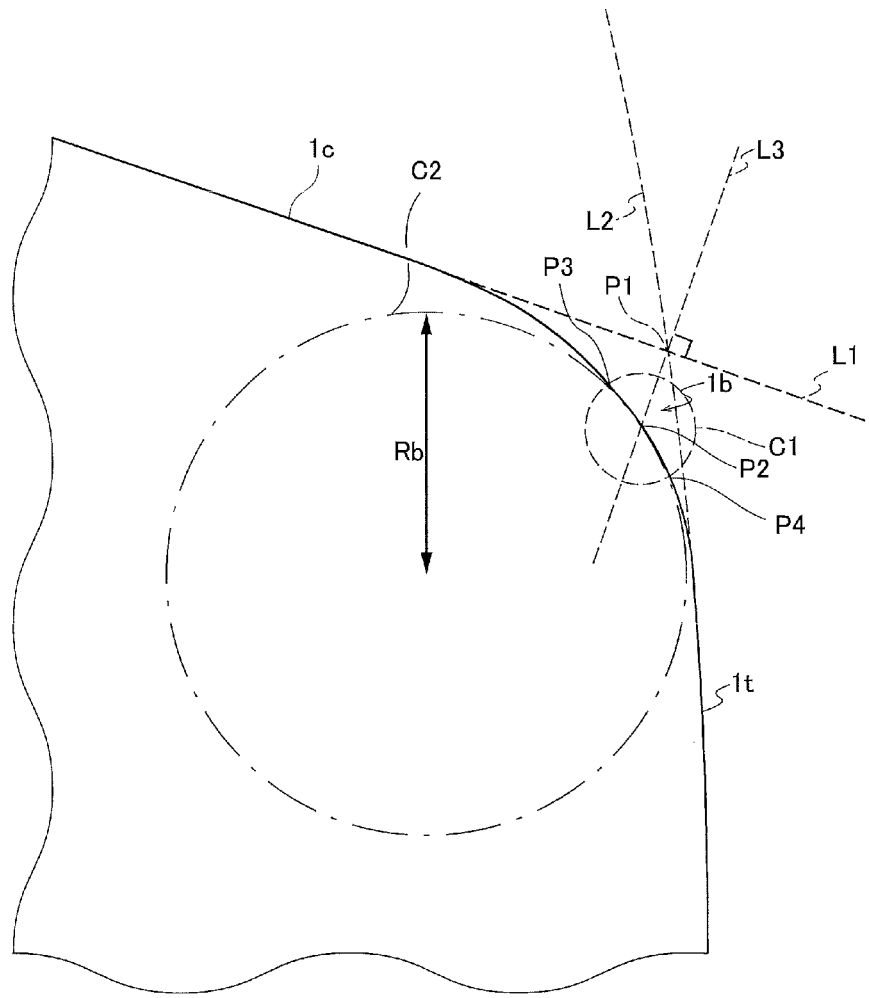

[Fig. 7]
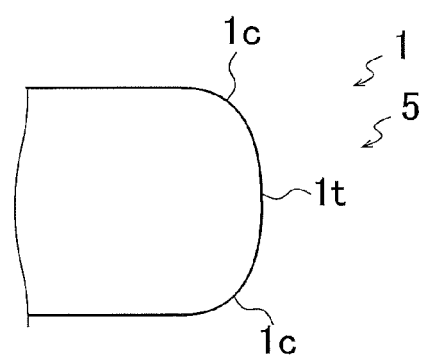

MAGNETIC DISK SUBSTRATE, MAGNETIC DISK, ANNULAR-SHAPED SUBSTRATE, AND METHOD FOR MANUFACTURING MAGNETIC DISK SUBSTRATE

CROSS-REFERENCE TO RELATED APPLICATIONS

This U.S. National stage application of International Patent Application No. PCT/JP2022/007710, filed on Feb. 24, 2022, which, in turn, claims priority to Japanese Patent Application No. 2021-027888, filed in Japan on Feb. 24, 2021. The entire contents of Japanese Patent Application No. 2021-027888 are hereby incorporated herein by reference.

BACKGROUND

Field of the Invention

The present invention relates to a magnetic-disk substrate provided with two main surfaces and an outer circumferential edge surface, a magnetic disk, an annular substrate, and a method for manufacturing a magnetic-disk substrate.

Background Information

Following the expansion of cloud computing in recent years, many hard disk drive (HDD) devices are used in data centers for a cloud in order to increase the storage capacity. A magnetic disk obtained by providing a magnetic layer on an annular nonmagnetic substrate for a magnetic disk is used as a storage medium in an HDD device. In order to increase the storage capacity of an HDD device, it is preferable to increase the number of mounted magnetic disks by reducing the thickness of magnetic disks.

When a magnetic-disk substrate is manufactured, from the viewpoint of preventing minute particles from forming on edge surfaces of a magnetic-disk substrate that will be a final product, it is preferable that surfaces of the magnetic-disk substrate are smoothened. Also, from the viewpoint of precisely incorporating magnetic disks into an HDD device, for example, it is preferable that edge surfaces of the magnetic-disk substrate have target shapes.

Conventionally, a shape having two chamfered surfaces that are respectively connected to main surfaces, and a side wall surface extending in a plate thickness direction between the chamfered surfaces is known as a shape of an edge surface of a magnetic-disk substrate. Such an edge surface shape can be obtained by grinding an edge surface using a formed grindstone having a grinding surface shaped to correspond to the shapes of target chamfered surfaces and a target side wall surface, for example (JP 2010-238302A). Also, conventionally, a glass substrate having a protruding curved edge surface in which regions between main surfaces and an outer surface are continuous with each other is known (JP 2006-40361A).

SUMMARY

Main surfaces of an annular plate (annular substrate) whose edge surfaces are processed to target shapes are further polished using a double-side polishing apparatus. Polishing (double-side polishing) is performed using a double-side polishing apparatus in a state in which the annular substrate is accommodated in a holding hole in a holding member (carrier) that holds the annular substrate, and the annular substrate is sandwiched between surface plates from top and bottom. At this time, the carrier needs to be thinner than the annular substrate. If such double-side polishing is performed on an annular substrate having a curved edge surface, the annular substrate may come loose from the holding hole in the carrier and move onto the carrier. In particular, if the annular substrate that is to be polished is thin, the carrier needs to be thinner than the annular substrate, and thus the annular substrate is likely to move onto the carrier. If polishing is continued in a state in which the annular substrate has moved onto the carrier, the main surfaces thereof are likely to be scratched. Further, if a strong force is applied to the annular substrate sandwiched between the surface plates and the carrier, a crack and/or fracture may occur in the annular substrate, resulting in impairment. The above phenomenon may occur in a case where both main surfaces of the annular substrate are ground using a holding member.

In view of this, the present invention aims to provide an annular substrate that is unlikely to come loose from a holding member that holds the annular substrate while double-side grinding or double-side polishing is performed on the annular substrate, a magnetic-disk substrate, a magnetic disk, and a method for manufacturing a magnetic-disk substrate.

One aspect of the present invention is a magnetic-disk substrate including two main surfaces and an outer circumferential edge surface. In the magnetic-disk substrate, the outer circumferential edge surface includes two chamfered surfaces that are respectively connected to the main surfaces, and a side wall surface that is curved and extends to protrude outward between the two chamfered surfaces, and the side wall surface has a radius of curvature of 1100 μm or more on a cross-section of the magnetic-disk substrate extending along a plate thickness direction of the magnetic-disk substrate.

It is preferable that the side wall surface has a radius of curvature of 2000 μm or less.

It is preferable that a length in a direction parallel to the main surface between a connection position at which the chamfered surface is connected to the main surface and a position at which the side wall surface protrudes most outward is 100 μm or less.

It is preferable that the chamfered surface is curved to protrude outward, and the chamfered surface has a radius of curvature that is smaller than the radius of curvature of the side wall surface, on a cross-section of the magnetic-disk substrate extending along the plate thickness direction of the magnetic-disk substrate.

It is preferable that the chamfered surface has a radius of curvature of 100 to 500 μm.

It is preferable that a connection region of the chamfered surface located on the connection position side where the chamfered surface is connected to the main surface is inclined at an angle of 30 to 70 degrees with respect to the direction parallel to the main surface, on a cross-section of the magnetic-disk substrate extending along the plate thickness direction of the magnetic-disk substrate.

It is preferable that a boundary portion between the chamfered surface and the side wall surface is rounded on a cross-section of the magnetic-disk substrate extending along the plate thickness direction of the magnetic-disk substrate.

It is preferable that the magnetic-disk substrate has a plate thickness of less than 0.6 mm.

It is preferable that the magnetic-disk substrate is a glass substrate.

Another aspect of the present invention is a magnetic disk. The magnetic disk has at least a magnetic film on a surface of the magnetic-disk substrate.

Another aspect of the present invention is an annular substrate including two main surfaces, an outer circumferential edge surface, and an inner circumferential edge surface. In the annular substrate, the outer circumferential edge surface includes two chamfered surfaces that are respectively connected to the main surfaces, and a side wall surface that is curved and extends to protrude outward between the two chamfered surfaces, and the side wall surface has a radius of curvature of 1100 μm or more on a cross-section of the annular substrate extending along a plate thickness direction of the annular substrate.

Another aspect of the present invention is a method for manufacturing a magnetic-disk substrate, the method including processing for polishing at least a main surface of the annular substrate.

According to the above-described magnetic-disk substrate, magnetic disk, and annular substrate, it is possible to make it unlikely for an annular substrate to come loose from a holding member that holds the annular substrate while double-side grinding or double-side polishing is performed on the annular substrate. Also, according to the above-described method for manufacturing a magnetic-disk substrate, such a magnetic-disk substrate can be obtained.

BRIEF DESCRIPTION OF THE DRAWINGS

FIG. 1 is a diagram showing an external shape of a magnetic-disk substrate according to one embodiment.

FIG. 2 is a diagram showing an example of a cross-sectional shape of an outer circumferential edge surface of the magnetic-disk substrate.

FIG. 3 is a diagram showing a holding member that holds annular substrates in holding holes.

FIG. 4 is a diagram showing an annular substrate that has come loose from a holding hole and moved onto the holding member.

FIG. 5 is a diagram illustrating edge surface grinding using a formed grindstone.

FIG. 6 is a diagram illustrating a method for obtaining a radius of curvature of a boundary portion between a chamfered surface and a side wall surface.

FIG. 7 is a diagram showing another example of a cross-sectional shape of the outer circumferential edge surface of a magnetic-disk substrate.

DETAILED DESCRIPTION OF THE EMBODIMENTS

Hereinafter, a magnetic-disk substrate, a magnetic disk, an annular substrate, and a method for manufacturing a magnetic-disk substrate according to an embodiment will be described in detail. Note that, although an example in which a glass substrate is used as a member of a magnetic-disk substrate or an annular substrate will be described below, a metal substrate may be used as a member thereof, in addition to a glass substrate.

FIG. 1 is a diagram showing an external shape of a glass substrate, which is an example of a magnetic-disk substrate according to one embodiment. A glass substrate 1 has a circular outer circumference. The glass substrate 1 in the example shown in FIG. 1 is an annular substrate having an inner hole 3 that is concentric with the circle formed by the circular outer circumference and has an inner circumference.

That is to say, the glass substrate 1 in the example shown in FIG. 1 includes two main surfaces 1p and 1p (see FIG. 2), an outer circumferential edge surface 5, and an inner circumferential edge surface 7. Note that later-described chamfered surfaces and a side wall surface of the glass substrate 1 are not shown in FIG. 1.

The glass substrate 1 is a glass substrate for a magnetic disk (magnetic-disk glass substrate). There is no limitation on the size of the glass substrate 1, and the magnetic-disk glass substrate has a nominal diameter of 2.5 inches or 3.5 inches, for example. In the case of a magnetic-disk glass substrate with a nominal diameter of 2.5 inches, the outer diameter thereof is in a range of 55 to 70 mm, for example, the outer diameter is 65 mm, 67 mm, or 58 mm, the diameter of the inner hole is 20 mm, and the plate thickness is in a range of 0.3 to 1.3 mm, for example. In the case of a magnetic-disk glass substrate with a nominal diameter of 3.5 inches, the outer diameter thereof is in a range of 85 to 100 mm, for example, the outer diameter is 95 mm, 97 mm, or 89 mm, the diameter of the inner hole is 25 mm, and the plate thickness is in a range of 0.3 to 1.3 mm, for example. A plate thickness T of the glass substrate 1 (see FIG. 2) is preferably as thin as possible in that a magnetic disk can be made thin and the number of magnetic disks mounted on an HDD device can be increased, and the plate thickness T is less than 0.6 mm, 0.56 mm or less, 0.51 mm or less, 0.46 mm or less, and 0.41 mm or less, these values being stated in order of preferability. Note that numeral values of the above diameters and plate thickness are nominal values, and thus some numeral values may slightly deviate from the nominal values due to variations in production and the like. Also, when an aluminum alloy substrate provided with a nickel alloy plating film on its surface is used instead of a glass substrate, the above values correspond to values regarding the entire substrate including the thickness of the nickel alloy plating film.

FIG. 2 shows an example of the cross-sectional shape of the outer circumferential edge surface 5 extending along the plate thickness direction of the glass substrate 1.

The outer circumferential edge surface 5 includes two chamfered surfaces 1c and 1c and a side wall surface 1t.

The two chamfered surfaces 1c and 1c are respectively connected to the main surfaces 1p and 1p. In the present invention, even in a case where a chamfered surface is not a flat surface, such as a curved surface, which will be described later, the surface is referred to as a chamfered surface.

The side wall surface 1t is curved and extends so as to protrude outward between the chamfered surfaces 1c and 1c. Also, the side wall surface 1t has a radius of curvature Rt of 1100 μm or more on a cross-section that passes through the center of a circular shape of the outer circumference of the glass substrate 1 and extends along the plate thickness direction of the glass substrate 1 (hereinafter, referred to as a "cross-section" extending along the plate thickness direction or simply referred to as a "cross-section"). With the glass substrate 1 provided with the side wall surface 1t having such a form, when double-side grinding or double-side polishing is performed on an annular glass substrate (hereinafter also referred to as a "glass plate"), which is a blank of the glass substrate 1, the glass plate is unlikely to come loose from a holding hole in a holding member (carrier). Therefore, the glass plate is unlikely to move onto a carrier, and it is possible to inhibit a scratch, a crack, or a fracture from occurring in a main surface of the glass plate as a result of continuing double-side grinding or double-side polishing in a state in which the glass plate has moved onto the carrier. Note that the above cross-sectional shape can be measured using a contour shape measurement device such as a Contracer manufactured by Mitutoyo Corp., for example.

Double-side grinding or double-side polishing is performed on a glass plate using a double-side grinding apparatus or a double-side polishing apparatus provided with a planetary gear mechanism. As shown in FIG. 3, double-side grinding using a double-side grinding apparatus and double-side polishing using a double-side polishing apparatus are performed in a state in which glass plates G are correspondingly accommodated in holding holes 18a in a carrier 18, and the glass plates G are sandwiched between surface plates 14 and 12 from both above and below. The glass plates G shown in FIG. 3 are sandwiched between the surface plates 14 and 12 via grinding members or polishing pads 20. Chamfered surfaces and a curved side wall surface of the glass plates G are not shown in FIG. 3. The carrier 18 is thinner than the glass plate G in order to secure a machining allowance for the two main surfaces of each glass plate G. Also, a thin carrier 18 is preferable in order to ensure a high polishing rate. Thus, if the radius of curvature of the side wall surface of the glass plate is excessively small, a central portion of a glass plate G' (see FIG. 4) in the plate thickness direction of the glass plate G' will be sharpened outward. Therefore, during double-side grinding or double-side polishing, an edge portion of a carrier 18 that is in contact with the glass plate G' is likely to slip in the plate thickness direction with respect to the glass plate G', and the glass plate G' is likely to come loose from a holding hole 18a. Thus, as shown in FIG. 4, the glass plate G' that has come loose from the holding hole 18a is likely to move onto the carrier 18. There are cases where, if grinding or polishing is continued in a state where the glass plate G' has moved onto the carrier 18, a main surface of the glass plate G' is likely to be scratched through contact with the carrier 18, and a strong force is applied to the glass plate G' sandwiched between the surface plates 14 and 12 and the carrier 18, resulting in the formation of a fracture or crack in the glass plate. In particular, a thin carrier 18 is used to perform double-side grinding or double-side polishing on a thin glass plate, and thus it is more likely that the glass plate will come loose from the holding hole 18a. By limiting the radius of curvature Rt of the side wall surface 1t of the glass substrate 1 according to this embodiment to 1100 μm or more, a thin glass plate G is inhibited from coming loose from the holding hole 18a. In this respect, it is preferable that the side wall surface 1t has a radius of curvature Rt of 1200 μm or more.

As will be described later, because the glass substrate 1 is produced from the glass plate G, which has been produced through edge surface processing or edge surface polishing, cross-sectional shapes of the side wall surface and chamfered surfaces included in the outer circumferential edge surface of the glass plate G are also maintained in the glass substrate 1. Further, when a later-described magnetic disk is to be produced by forming a magnetic film and the like on a surface of a glass substrate 1 for a magnetic disk, the total film thickness of the magnetic film and the like is, for example, 100 nm or less, which is sufficiently thin relative to the plate thickness. Therefore, cross-sectional shapes of the side wall surface and the chamfered surfaces included in the outer circumferential edge surface of the glass substrate 1 are also maintained in a magnetic disk.

Note that, in this specification, the term "outward" refers to the side away from the center of the circular shape of the outer circumference of the glass substrate 1, and the wording "protrude outward" refers to protruding outward from a straight line connecting two ends of the side wall surface 1t or the chamfered surfaces 1c in the plate thickness direction.

The radius of curvature Rt of the side wall surface 1t is specified as the radius of an arc passing through three specific points on the side wall surface 1t that differ from each other in the plate thickness direction. In the example shown in FIG. 2, the radius of curvature Rt of the side wall surface 1t can be specified as the radius of an arc passing through three points that are T3 and two intersection points between a virtual circle and the side wall surface 1t where T3 is a point on the side wall surface 1t that passes through the center of the glass substrate 1 in the plate thickness direction and intersects with a plane parallel to the main surface 1p, and the virtual circle with a radius of 100 μm is drawn with T3 as the center. Note that, if the length of the side wall surface 1t is less than 200 μm and the arc of the virtual circle and the side wall surface 1t do not fit each other, the radius of the virtual circle may be reduced as appropriate.

The cross-sectional shape of the outer circumferential edge surface 5 of the glass substrate 1 that includes the side wall surface 1t can be obtained by producing the glass plate G using a formed grindstone 30 shown in FIG. 5, for example. FIG. 5 shows the formed grindstone 30 and a plate member (referred to as a "glass plate member") that is not yet subjected to edge surface grinding and that is to be processed into a glass plate G. In FIG. 5, out of the region of the glass plate member, a dashed region indicates a region to be removed through edge surface grinding. Also, in FIG. 5, an arrow indicating the left direction indicates a direction in which the formed grindstone 30 moves relative to the glass plate member when edge surface grinding is performed. The formed grindstone 30 has a round columnar shape or a cylindrical shape as a whole, for example, and the outer circumferential surface thereof has a groove 31. The groove 31 may be configured such that the side wall surface and the chamfered surfaces of the glass plate G can be formed through grinding processing simultaneously. Specifically, the groove 31 includes a grinding surface having a side wall portion 31b and chamfered portions 31a located on two sides of the side wall portion 31b. The side wall portion 31b and the chamfered portions 31a of the groove 31 are formed into shapes with predetermined dimensions in consideration of a target finish shape of the outer circumferential edge surface of the glass plate G or the glass substrate 1.

According to an embodiment, it is preferable that the side wall surface 1t has a radius of curvature Rt of 2000 μm or less. Because the side wall surface 1t having a radius of curvature of more than 2000 μm extends substantially linearly in the plate thickness direction, a corner portion present between the side wall surface 1t and the chamfered surface 1c is likely to be sharpened. When the glass plate G is produced using the formed grindstone 30, a load is likely to be concentrated on a portion of the glass plate member, which becomes such a corner portion, under a load applied by the formed grindstone 30. Thus, chipping may occur. In particular, the glass plate member, which is to be a thin glass substrate 1, has a small plate thickness, and its rigidity is likely to decrease. Therefore, the glass plate member is likely to warp under a load applied by the formed grindstone 30, and the load is likely to be concentrated on the corner portion. In this respect, it is more preferable that the side wall surface 1t has a radius of curvature Rt of 1800 μm or less.

According to an embodiment, it is preferable that a length Lc (see FIG. 2) extending in a direction that is parallel to the main surface 1p between a connection position Pc at which the chamfered surface 1c is connected to the main surface 1p and a position at which the side wall surface 1t protrudes outward most, is preferably 100 μm or less. Restriction of the length Lc in this manner inhibits the overall cross-sectional shape of the outer circumferential edge surface 5 from sharpening outward, thus contributing to improving the effect of inhibiting the glass plate G from coming loose from the holding hole 18a. It is presumed that this is because, as the sharpness of the cross-sectional shape of the outer circumferential edge surface 5 decreases, gaps with upper and lower surface plates decrease in size. In this respect, it is more preferable that the length Lc is 80 μm or less. The upper limit of the length Lc is 150 μm, for example. On the other hand, it is preferable that the length Lc is 20 μm or more in order to prevent chipping during handling of the glass plate G. Also, when the degree of sharpness is represented by the value of Lc/T, Lc/T is preferably 0.25 or less. If Lc/T is more than 0.25, there are cases where the sharpness increases excessively, and the glass plate G is more likely to come loose from the holding hole. On the other hand, Lc/T is preferably 0.1 or more. If the Lc/T value is less than 0.1, there are cases where chipping is likely to occur. With this in mind, it is more preferable that the Lc/T value is in a range of 0.1 to 0.25.

According to an embodiment, it is preferable that the chamfered surface 1c is curved to protrude outward. In this case, it is preferable that the chamfered surface 1c has a radius of curvature Rc that is smaller than the radius of curvature Rt of the side wall surface 1t on a cross-section extending along the plate thickness direction of the glass substrate 1. Because the chamfered surface 1c having such a form is provided, the overall cross-sectional shape of the outer circumferential edge surface 5 is likely to be less sharp outward, thus contributing to improving the effect of inhibiting the glass plate G from coming loose from the holding hole 18a. Also, because the chamfered surface 1c having the above form is provided, the angle formed between the chamfered surface 1c and the side wall surface 1t is less likely to be small (i.e., a boundary portion 1b (which will be described later) between the chamfered surface 1c and the side wall surface 1t is less likely to be sharp), thus inhibiting a load from being concentrated at a portion of the glass plate member, which is to become a corner portion present between the chamfered surface 1c and the side wall surface 1t, and improving the effect of suppressing the occurrence of chipping when a glass plate G is produced using the formed grindstone 30. That is, because the chamfered surface 1c has the above form, it is possible to improve the effect of suppressing the occurrence of chipping when the glass plate G is produced using the formed grindstone 30 while inhibiting the glass plate G from coming loose from the holding hole 18a. In this respect, it is preferable that the chamfered surface 1c has a radius of curvature Rc of 100 to 1000 μm.

The radius of curvature Rc when the chamfered surface 1c is curved is specified as the radius of an arc passing through three specific points on the chamfered surface 1c that differ from each other in the plate thickness direction. That is, the radius of curvature Rc of the chamfered surface 1c can be specified as the radius of an arc passing through three points of (1) a connection position Pc on one main surface side, (2) a position on the chamfered surface 1c located at a position 30 μm from the connection position Pc in the plate thickness direction, and (3) a position on the chamfered surface located at a position 60 μm from the connection position Pc in the plate thickness direction.

Also, on a cross-section extending along the plate thickness direction of the glass substrate 1, a connection region Ica of the chamfered surface 1c located on the connection position Pc side where the chamfered surface 1c is connected to the main surface 1p is preferably inclined at an inclination angle θ of 30 to 70 degrees with respect to a direction parallel to the main surface 1p. By forming the chamfered surface 1c inclined in this manner, the connection between the chamfered surface 1c and the curved side wall surface 1t becomes comparatively smooth, thus improving the effect of suppressing the occurrence of chipping when the glass plate G is produced using the formed grindstone 30 while inhibiting the glass plate G from coming loose from the holding hole 18a. Note that the connection region Ica is a region extending in a range of 5 to 20 μm in the plate thickness direction from the connection position Pc, for example. Here, the reason why the immediate vicinity of the connection position Pc (a region extending in a range of less than 5 μm in the plate thickness direction from the main surface 1p) is excluded is that, although the connection position Pc does not look like it has a radius of curvature in the drawings, the connection position Pc actually has a physically finite radius of curvature. This can be understood by enlarging a cross-sectional image. It is sufficient that the inclination angle θ of the connection region when the connection position Pc is rounded or when the chamfered surface 1c is a curved surface is an angle at which a tangent line at the position of the connection region Ica located at a position 10 μm in the plate thickness direction from the connection position Pc is inclined with respect to a direction parallel to the main surface 1p.

According to an embodiment, on a cross-section of the outer circumferential edge surface 5 of the glass substrate 1 extending along the plate thickness direction of the glass substrate 1, a boundary portion 1b (see FIG. 6) between the chamfered surface 1c and the side wall surface 1t is preferably rounded. The boundary portion 1b is a portion interposed between the chamfered surface 1c and the side wall surface 1t and connected to the chamfered surface 1c and the side wall surface 1t. Because such a boundary portion 1b is provided, the chamfered surface 1c and the side wall surface 1t are connected by a smooth curved line, and the cross-sectional shape of the outer circumferential edge surface 5 is likely to have a smooth curved shape as a whole.

Such a cross-sectional shape of the outer circumferential edge surface 5 contributes to improving the effect of suppressing the occurrence of chipping when the glass plate G is produced using the formed grindstone 30 while inhibiting the glass plate G from coming loose from the holding hole 18a.

From the above viewpoint, the boundary portion 1b preferably has a radius of curvature of 150 to 1500 μm, and more preferably has a radius of curvature of 150 to 400 μm on a cross-section extending along the plate thickness direction of the glass substrate 1. Note that the radius of curvature of the boundary portion 1b is smaller than the radius of curvature of the side wall surface 1t. The radius of curvature R of the boundary portion can be obtained as follows.

FIG. 6 is a diagram illustrating a method for obtaining the radius of curvature of a cross-sectional shape of the boundary portion 1b. In FIG. 6, Rb represents the radius of a circle C2 that forms a curvature equivalent to the curvature of the boundary portion 1b on a cross-sectional shape, and represents the radius of curvature of the shape of the boundary portion 1b. First, an intersection point of a straight section of the chamfered surface 1c or a virtual line L1 obtained by extending the side wall surface 1t along the above-described arc of the side wall surface 1t and a virtual arc L2 extending along the above-described arc of the side wall surface 1t is denoted by P1. Then, a virtual line L3, which passes through the intersection point P1 and extends perpendicularly to the virtual line L1, is set. Then, an intersection point of the boundary portion 1*b* and the virtual line L3 is denoted by P2. Then, on a cross-section of the glass substrate 1, a circle C1 having a predetermined radius (e.g., 25 μm) about the intersection point P2 is set. Then, two intersection points of the boundary portion 1*b* and the outer circumference of the circle C1 are respectively denoted by P3 and P4. Further, a circle C2 that passes through the three intersection points P2, P3, and P4 is set. The radius of curvature R of the cross-sectional shape of the boundary portion 1*b* can be obtained by obtaining the radius of the circle C2. Note that, if the position of the boundary portion 1*b* is not clearly recognizable and the virtual line L1 and/or the virtual arc L2 cannot be set appropriately, it is sufficient that the radius of curvature R is a value obtained when the radius of curvature Rb of the circle C2 is the smallest in the vicinity of a portion thought to be the boundary portion 1*b*. In this case, it is sufficient that the position of the intersection point P2 is temporarily set on an edge surface, and the circle C2 is set while moving the position of the intersection point P2 as appropriate. Note that, at this time, the intersection point P3 and the intersection point P4 need to be located on the edge surface.

FIG. 7 is a diagram showing another example of a cross-sectional shape of the outer circumferential edge surface 5 of the glass substrate 1. As shown in FIG. 7, the cross-sectional shape of the outer circumferential edge surface 5 of the glass substrate 1 may be a single curved surface shape, which is curved as a whole due to all of the chamfered surfaces 1*c*, the connection position Pc, and the boundary portion 1*b* (T1 and T2 shown in FIG. 2) being curved (or rounded). Also, the cross-sectional shape of the outer circumferential edge surface 5 of the glass substrate 1 may be a shape in which at least one of the chamfered surfaces 1*c*, the connection position Pc, and the boundary portion 1*b* (T1 and T2 shown in FIG. 2) is curved (or rounded).

Although there is no particular limitation on a length Lt (see FIG. 2) of the side wall surface 1*t* in the plate thickness direction, the length Lt is 0.2 to 0.5 mm, for example.

Although there is no particular limitation on a length Lc2 (see FIG. 2) of the chamfered surface 1*c* in the plate thickness direction, the length Lc2 is 0.02 to 0.15 mm, for example.

Although there is no particular limitation on a length Lc1 (see FIG. 2) of the chamfered surface 1*c* in a direction parallel to the main surface 1*p*, the length Lc1 is 0.02 to 0.15 mm, for example.

The cross-sectional shape of the inner circumferential edge surface 7 of the glass substrate 1 may be the same as or different from the cross-sectional shape of the outer circumferential edge surface 5.

(Annular Substrate)

A glass plate G, which is an example of an annular substrate according to an embodiment, includes two main surfaces, an outer circumferential edge surface, and an inner circumferential edge surface, and has an annular shape.

The outer circumferential edge surface of the glass plate G includes two chamfered surfaces that are respectively connected to the main surfaces, and a side wall surface that is curved and extends to protrude outward between the two chamfered surface. The side wall surface of the glass plate G has a radius of curvature of 1100 μm or more on a cross-section of the glass plate extending along the plate thickness direction of the glass plate. The glass plate G is used as a blank of the glass substrate 1 according to the above embodiment.

It is preferable that the side wall surface of the glass plate G has a radius of curvature of 2000 μm or less.

It is preferable that a length extending in a direction that is parallel to a main surface between a connection position at which a chamfered surface of the glass plate G is connected to the main surface and a position at which the side wall surface of the glass plate G protrudes outward most, is preferably 200 μm or less.

It is preferable that the chamfered surface of the glass plate G is curved to protrude outward, and the chamfered surface of the glass plate G has a radius of curvature that is smaller than the radius of curvature of the side wall surface of the glass plate G, on a cross-section extending along the plate thickness direction of the glass plate G.

It is preferable that the chamfered surface of the glass plate G has a radius of curvature of 100 to 500 μm.

It is preferable that a connection region of the chamfered surface located on the connection position side where the chamfered surface is connected to the main surface is inclined at an angle of 10 to 70 degrees with respect to the direction parallel to the main surface, on a cross-section of the glass plate G extending along the plate thickness direction of the glass plate G. The connection region is configured similarly to the connection region Ica of the glass substrate 1.

It is preferable that the boundary portion between the chamfered surface and the side wall surface is rounded on a cross-section of the glass plate G extending along the plate thickness direction of the glass plate G. The boundary portion is configured similarly to the boundary portion 1*b* of the glass substrate 1.

It is preferable that the glass plate G has a plate thickness T of less than 0.6 mm.

(Method for Producing a Magnetic-Disk Substrate)

A method for manufacturing a magnetic-disk substrate according to an embodiment includes processing for polishing at least a main surface of an annular substrate. An annular substrate to be polished is the annular substrate according to the above embodiment. Hereinafter, a case where the above glass plate is used will be described as an annular substrate. Although there is no particular limitation on a glass plate, a glass plate is produced from a glass plate member manufactured using a float method, a downdraw method, or a pressing method, for example. It is possible to obtain a plurality of annular glass plate members provided with inner holes, from a large sheet-shaped glass plate member manufactured using a float method or a downdraw method, for example. A method for obtaining annular glass plate members from the large sheet-shaped glass plate member may be carried out by forming cutting lines and cutting along the cutting lines using a known scriber (cutter), or by forming circular defects by irradiating the glass plate member with a laser beam and cutting glass plate members out from the large sheet-shaped glass plate member. An inner hole is a hole that is substantially concentric with the circle formed by the above-mentioned circular defect.

It is possible to use amorphous glass such as aluminosilicate glass, soda lime glass, or borosilicate glass as the material of glass of the glass plate. The glass plate has a glass transition temperature Tg of 450° C. to 850° C., for example.

The annular glass plate member (substrate made of glass) is formed into a glass plate through edge surface processing. Edge surface processing can be performed through edge surface grinding using a formed grindstone, or edge surface melting by irradiating an edge surface of a glass plate member with a laser beam. If an above method is used, it is possible to form a single curved surface shape in which the entire edge surface is smoothly curved and continuous, while chipping caused by grinding processing is avoided. Also, formation of such an edge surface can suppress chipping occurring in subsequent processes such as grinding and polishing of main surfaces, and magnetic film formation. After edge surface processing, edge surface polishing for polishing the edge surfaces of the glass plate can be further performed. Edge surface polishing can be performed using a polishing brush while loose abrasive particles are supplied to the edge surfaces of the glass plate. If edge surface processing is performed through edge surface melting using a laser beam, edge surface polishing may be optionally performed after edge surface processing.

The outer circumferential edge surface of the glass plate can be formed into the above-described cross-sectional shape by adjusting the shape of a grinding surface of the formed grindstone, and conditions of the edge surface polishing using a polishing brush, for example.

With the manufacturing method according to this embodiment, it is possible to perform various processes such as grinding, first polishing, second polishing, chemical strengthening, and cleaning, which will be described later.

In grinding processing, the main surfaces of the glass plate are ground using a double-side grinding apparatus. Specifically, the glass plate is accommodated in a holding hole of a carrier of the double-side grinding apparatus, and two main surfaces of the glass plate are ground while the outer circumferential edge surface of the glass plate is being held. The double-side grinding apparatus includes a pair of upper and lower surface plates (upper surface plate and lower surface plate), and the glass plate is sandwiched between the upper surface plate and the lower surface plate. Also, the glass plate and the surface plates are moved relative to each other by moving one or both of the upper surface plate and the lower surface plate while supplying a coolant, and thus the two main surfaces of the glass plate are ground. Grinding can be performed by attaching grinding members (diamond pads), which are obtained by forming fixed abrasive particles that are pieces of diamond fixed with resin into sheets, to the surface plates, for example. Also, a combination of surface plates made of cast iron and a slurry containing alumina abrasive particles may be used instead of a combination of diamond pads and a coolant. As described above, the carrier needs to be thinner than a glass plate to be held, and specifically, the thickness of the carrier is preferably smaller than the thickness of the glass plate by 0.05 mm or more, more preferably smaller than the thickness of the glass plate by 0.1 mm or more, and even more preferably smaller than the thickness of the glass plate by 0.15 mm or more. Further, although the diameter of the holding hole needs to be larger than the diameter of the glass plate to be held, it is sufficient that the diameter of the holding hole is larger than the diameter of the glass plate by a range of 0.1 to 3.0 mm, for example.

The first polishing is performed on the main surfaces of the ground glass plate. Specifically, the glass plate is accommodated in a holding hole of a carrier of a double-side polishing apparatus, and two main surfaces of the glass plate are polished while the outer circumferential edge surface of the glass plate is held. The first polishing is performed in order to remove blemishes and strain remaining on the ground main surfaces or adjust minute surface unevenness (micro-waviness, roughness) remaining thereon. The first polishing is preferably mirror polishing.

In the first polishing processing, two main surfaces of a glass plate are polished using a double-side polishing apparatus provided with a configuration similar to that of the double-side grinding apparatus, while a polishing slurry containing loose abrasive particles is being provided. Cerium oxide abrasive particles, zirconia abrasive particles, or the like are used as loose abrasive particles used in the first polishing, for example. Similarly to the double-side grinding apparatus, in the double-side polishing apparatus, a glass plate is sandwiched between upper and lower surface plates. Polishing pads (e.g., resin polishers) are respectively attached to surfaces of the lower surface plate and the upper surface plate. A suede polishing pad made of a resin such as polyurethane foam and having minute openings in its surface is preferably used because the surface of a glass plate is unlikely to be scratched and can be easily mirror-finished. Also, the glass plate and the surface plates are moved relative to each other by moving one or both of the upper surface plate and the lower surface plate, and thus the two main surfaces of the glass plate are polished. The size of the polishing abrasive particles is preferably in a range of 0.5 to 3 μm in terms of an average particle size (D50).

The second polishing is performed on the glass plate obtained after being subjected to the first polishing. The second polishing processing is performed in order to mirror-polish the main surfaces of the glass plate. A double-side polishing apparatus having a configuration that is similar to that of the double-side polishing apparatus used in the first polishing is used in the second polishing as well. Specifically, the glass plate is accommodated in a holding hole of a carrier of the double-side polishing apparatus, and two main surfaces of the glass plate are polished while the outer circumferential edge surface of the glass plate is being held. The second polishing processing differs from the first polishing processing in that the type and particle size of loose abrasive particles are different, and the hardness of the resin polishers is different. It is preferable that the hardness of a resin polisher is less than that in the first polishing processing. A polishing liquid containing colloidal silica as loose abrasive particles is supplied between the polishing pads of the double-side polishing apparatus and the main surfaces of the glass plate, and the main surfaces of the glass plate are polished, for example. The size of polishing abrasive particles used in the second polishing is preferably in a range of 5 to 50 nm in terms of an average particle size (d50). A suede polishing pad made of a resin such as polyurethane foam and having minute openings in its surface is preferably used because the surface of a glass plate is unlikely to be scratched and can be easily mirror-finished.

If chemical strengthening is to be performed, chemical strengthening is preferably performed before or after the second polishing. In chemical strengthening processing, a melt in which potassium nitrate and sodium nitrate are mixed, for example, can be used as a chemical strengthening liquid, and the glass plate is immersed in the chemical strengthening liquid. Accordingly, it is possible to form a compressive stress layer on the surface of the glass plate G through ion exchange. Whether or not chemical strengthening processing is to be carried out need only be selected as appropriate in consideration of the composition of the glass and how necessary chemical strengthening processing may be therefor.

Other polishing processing may be further added in addition to the first polishing processing and the second polishing processing, or first polishing processing and second polishing processing may be completed through a single polishing process. Also, the order of the above-described processes may be changed as appropriate.

Cleaning is performed using a cleaning liquid (e.g., water) after ultimately performed polishing processing or a process performed after chemical strengthening processing. Also, other cleaning processing may be added as appropriate between processes such as the above grinding, polishing, and chemical strengthening.

Here, a method for manufacturing a magnetic-disk substrate used in a case where a metal substrate is used as a member of an annular substrate will be described. It is also possible to use an aluminum alloy having a nickel alloy film on its surface, as a member of a metal substrate, for example. It is possible to use, as an aluminum alloy, an Al—Mg (aluminum-magnesium)-based alloy, which contains at least magnesium, for example. It is possible to use, as a nickel-alloy film, a film plated with a Ni—P (nickel-phosphorous)-based alloy, which contains at least phosphorus, for example. Further, a titanium alloy, single crystal silicon, or the like may be used instead of an aluminum alloy, and a nickel alloy film need not be provided. In particular, it is possible to suitably use a substrate made of an aluminum alloy having a nickel alloy film on its surface, the aluminum alloy substrate being relatively light in weight, having high strength, and being able to be easily processed.

When an aluminum alloy substrate having a nickel alloy film on its surface is manufactured instead of a glass substrate, a disk-shaped plate member (substrate made of an aluminum alloy) is cut out from an aluminum alloy plate member, heated and annealed at predetermined temperatures and predetermined time periods, and main surface cutting and edge surface shaping are performed. In edge surface shaping, an edge surface is ground or cut into a predetermined shape using a tool such as a forming tool or a single point cutting tool. Here, in edge surface processing performed on a substrate made of an aluminum alloy, minute recesses may form so as to correspond to chipping in the glass plate. It is conceivable that this is due to surface tears and crystallized substances falling off due to sliding between the substrate surface and the tool. These minute recesses are not preferable because such recesses remain on the surface of the substrate even after a nickel alloy film, a magnetic film, and the like are formed, and when a magnetic disk is rotated at high speeds, an unstable air flow is generated, which worsens fluttering of the magnetic disk. These minute recesses increase or decrease under the influence of a target shape of the edge surface. Annealing may be performed after an edge surface or a surface is processed. Then, it is sufficient that a nickel alloy plating film is formed on a surface thereon at a thickness of 3 to 20 µm, for example. Here, because the thickness of a plating film is sufficiently smaller than the thickness of the entire substrate, the shape of an edge surface formed through grinding or cutting maintains substantially the same shape even after a plating film is formed. Then, a surface of an aluminum alloy substrate (annular substrate) provided with a nickel alloy plating film on its surface is polished. From the viewpoint of improving both surface quality and productivity, similarly to polishing performed on a glass plate described above, it is preferable to adopt, as polishing processing, a polishing process divided into two or more stages. With regard to a specific polishing method, polishing can be performed on the substrate in a manner similar to that for polishing the glass plate described above, except that it is preferable to use a polishing liquid containing alumina abrasive particles in first polishing (rough polishing).

An annular substrate provided with the outer circumferential edge surface having the above-described cross-sectional shape is manufactured in this manner, at least a main surface of the annular substrate is polished, and thus a magnetic-disk substrate that satisfies conditions required for the magnetic-disk substrate can be manufactured.

A magnetic disk is then manufactured by forming at least a magnetic film on a main surface of the magnetic-disk substrate. Then, an HDD that includes the magnetic disk and a magnetic head is manufactured.

(Magnetic Disk)

A magnetic disk according to an embodiment has at least a magnetic film on a surface of the magnetic-disk substrate. Preferably, a magnetic film need only be formed on at least a main surface of a magnetic-disk substrate. However, in general, a magnetic film is also formed on an edge surface of a magnetic-disk substrate. A magnetic disk preferably has films such as an undercoat film, a magnetic film, and a protective film in the stated order from the surface side of the magnetic-disk substrate.

Experiment Example 1-1

In order to examine effects of the present invention, edge surface grinding was performed using a formed grindstone whose grinding surface had various different shapes. Annular glass plates (annular substrates) each of which were provided with an outer circumferential edge surface including a side wall surface having the radius of curvature Rt shown in Table 1 below was produced, edge surface polishing was performed on the glass plates, main surfaces of the glass plates were ground, the above-described first polishing was performed using loose cerium oxide abrasive particles and suede polishing pads, and the frequency at which glass plates came loose from holding holes in a carrier was examined.

The glass plates having the specifications below were used for the first polishing. Note that all of the specifications regarding edge surfaces relate to outer circumferential edge surfaces.

The outer diameter was 97 mm, the inner diameter was 25 mm, and the plate thickness was 0.53 mm The radius of curvature Rt was as listed in Table 1.

A chamfered surface had a substantially linear shape on a cross-section, the inclination angle of the connection region was 45 degrees, and the length in the plate thickness direction was 85 µm The boundary portion between a side wall surface and a chamfered surface had a radius of curvature of less than 150 µm Annular glass plate made of aluminosilicate glass A machining allowance (polishing allowance) of a main surface in the first polishing was set to 25 µm (12.5 µm for each side) based on the plate thickness. Also, the thickness of the carrier was 0.3 mm.

First polishing was performed in a state in which twenty five glass plates G in total were accommodated in five carriers each having five holding holes (25 glass plates in one batch). Such first polishing was performed twenty times, and each time the first polishing was completed, the number of glass plates that had come loose from a holding hole and moved onto on a carrier was counted. When the total number thereof was less than 2% of the total number of the glass plates used in the first polishing, an A evaluation was given, when the total number thereof was 2% or more and less than 4%, a B evaluation was given, and when the total number thereof was 4% or more, a C evaluation was given. When A and B evaluations were given, the frequency at which a glass plate came loose from a holding hole (incidence rate) was low, and thus such a glass plate was acceptable. Results are shown in Table 1.

TABLE 1

|  | Rt (μm) | Frequency at which glass plates came loose from holding holes |
|---|---|---|
| Comp. Ex. 1 | 500 | C |
| Comp. Ex. 2 | 1000 | C |
| Work. Ex. 1 | 1100 | B |
| Work. Ex. 2 | 1200 | A |
| Work. Ex. 3 | 1500 | A |
| Work. Ex. 4 | 2000 | A |

It was found from comparisons between Working Examples and Comparative Examples that, when the side wall surface of a glass plate has a radius of curvature Rt of 1100 μm or more, the frequency at which the glass plates come loose from holding holes is low.

It was found from comparisons between Working Example 1 and Working Examples 2 to 4 that, when the side wall surface of a glass plate has a radius of curvature Rt of 1200 μm or more, the frequency at which the glass plates come loose from holding holes is low.

Experiment Example 1-2

First polishing was performed under the same conditions (Comparative Examples 3 and 4 and Working Examples 5 to 8) as those for Experiment Example 1-1 and Table 1, except that the plate thickness was changed to 0.48 mm in the specifications of the glass plates to be used in the first polishing. Results equivalent to those in Table 1 were obtained.

Experiment Example 1-3

First polishing was performed under the same conditions (Comparative Examples 5 and 6 and Working Examples 9 to 12) as those for Experiment Example 1-1 and Table 1, except that the plate thickness was changed to 0.43 mm in the specifications of the glass plates to be used in the first polishing. Results equivalent to those in Table 1 were obtained.

Experiment Example 1-4

First polishing was performed under the same conditions (Comparative Examples 7 and 8 and Working Examples 13 to 16) as those for Experiment Example 1-1 and Table 1, except that an annular substrate to be used in first polishing was changed to a substrate obtained by forming a 10 μm·NiP alloy plating film on a surface of an aluminum alloy substrate, instead of a glass plate, and loose abrasive particles were changed to alumina abrasive particles. Results equivalent to those in Table 1 were obtained.

Experiment Example 1-5

First polishing was performed under the same conditions (Comparative Examples 9 and 10 and Working Examples 17 to 20) as those for Experiment Example 1-1 and Table 1, except that an annular substrate to be used in first polishing was changed to a substrate with a plate thickness of 0.48 mm obtained by forming a 10 μm·NiP alloy plating film on a surface of an aluminum alloy substrate, instead of a glass plate, and loose abrasive particles were changed to alumina abrasive particles. Results equivalent to those in Table 1 were obtained.

Experiment Example 1-6

First polishing was performed under the same conditions (Comparative Examples 11 and 12 and Working Examples 21 to 24) as those for Experiment Example 1-1 and Table 1, except that the radius of curvature of a boundary portion between a side wall surface and a chamfered surface was changed to a range of 150 to 400 μm in the specifications of the glass plates to be used in the first polishing. Results equivalent to those in Table 1 were obtained.

Experiment Example 1-7

First polishing was performed under the same conditions (Comparative Examples 13 and 14 and Working Examples 25 to 28) as those for Experiment Example 1-1 and Table 1, except that the plate thickness was changed to 0.43 mm and the radius of curvature of a boundary portion between a side wall surface and a chamfered surface was changed to a range of 150 to 400 μm in the specifications of the glass plates to be used in the first polishing. Results equivalent to those in Table 1 were obtained.

Experiment Example 1-8

First polishing was performed under the same conditions (Working Example 29) as those for Working Example 3 of Experiment Example 1-1, except that each glass plate to be used in first polishing was subjected to edge surface melting using a laser beam and then main surfaces thereof were ground, and thus an outer circumferential edge surface of the glass plate looked like a single curved surface that was smoothly curved and continuous as a whole. The evaluation of the frequency at which glass plates came loose from holding holes was A. Note that the specifications of the outer circumferential edge surfaces are as follows.

The radius of curvature Rt was 1500 μm

A chamfered surface had a curved shape having a radius of curvature of 200 to 500 μm on a cross-section, the inclination angle of a connection region between the chamfered surface and a main surface was 40 degrees, and Lc was 100 μm The boundary portion between a side wall surface and a chamfered surface had a radius of curvature of 100 to 500 μm (Magnetic-Disk Substrate and Manufacturing of Magnetic Disk)

Out of the annular substrates obtained after being subjected to the first polishing in the above "Working Examples", annular substrates other than glass substrates that came loose from holding holes and glass substrates having problems such as chipping and minute recesses were cleaned, and the above second polishing was performed with a machining allowance of 5 μm (2.5 μm for each side) based on the plate thickness. The total machining allowance of the first polishing and the second polishing was 30 μm based on the plate thickness. Thus, when the plate thickness of a substrate before being subjected to the first polishing is 0.53 mm, for example, the plate thickness thereof after being subjected to the second polishing is 0.50 mm, for example. A polishing liquid containing colloidal silica and suede pads were used in the second polishing. Then, cleaning was performed to obtain a magnetic-disk glass substrate having an outer diameter of 97 mm, an inner diameter of 25 mm, and a plate thickness of 0.40 to 0.50 mm, or a magnetic-disk substrate obtained by forming a nickel alloy plating film on a surface of an aluminum alloy substrate. Thereafter, an undercoat film, a magnetic film, a protective film, and the like were successively formed on the surface of each magnetic-disk substrate to obtain a magnetic disk. The shapes of outer circumferential edge surfaces of the magnetic-disk substrates and the magnetic disks were checked. The length of chamfered surfaces Lc, Lc1, and Lc2 were slightly reduced due to the influence of main surface polishing, but with regard to other parameters such as the radius of curvature of the side wall surfaces, the shapes thereof before being subjected to the first polishing were substantially maintained.

Experiment Example 2-1

Edge surface grinding was performed using various formed grindstones in the same manner as in Experiment Example 1, and the frequency at which chipping occurred in a glass plate obtained after being subjected to edge surface grinding was examined.

The glass plate members having the specifications below were used for edge surface grinding. Note that all of the specifications regarding edge surfaces relate to outer circumferential edge surfaces.

The outer diameter was 98 mm, the inner diameter was 24 mm, and the plate thickness was 0.59 mm The edge surface has a shape extending substantially perpendicularly to a main surface on a cross-section An annular plate member made of aluminosilicate glass The machining allowance for edge surface grinding was 1 mm based on diameter for both the outer diameter and the inner diameter.

Further, a target shape of a chamfered surface of a glass plate obtained after being subjected to edge surface grinding was a linear shape on a cross-section, the inclination angle of the connection region was 45 degrees, the length in the plate thickness direction was 115 µm, Lt=360 µm, Lc was variable depending on Rt, and a boundary portion between a side wall surface and a chamfered surface had a radius of curvature of less than 150 µm.

Note that, in Reference Example, the side wall surface of the outer circumferential edge surface of a glass plate obtained after being subjected to edge surface grinding had a shape linearly extending in the plate thickness direction thereof.

In each experimental example, 500 glass plate members were processed using a formed grindstone having a grinding surface shaped to correspond to the above target shape and the radius of curvature Rt shown in Table 2 below, the outer circumferential edge surface of the glass plates obtained after completion of edge surface grinding were inspected using a condensing lamp in a dark room, and the frequency of chipping (incidence rate) was calculated by counting the number of glass plates that had chipped. When the total number of plate members that had chipped was less than 2%, an A evaluation was given, and when the total number of plate members that had chipped was 2% or more, a B evaluation was given.

TABLE 2

|  | Rt (µm) | Frequency of chipping |
|---|---|---|
| Work. Ex. 101 | 1100 | A |
| Work. Ex. 102 | 1200 | A |

TABLE 2-continued

|  | Rt (µm) | Frequency of chipping |
|---|---|---|
| Work. Ex. 103 | 1500 | A |
| Work. Ex. 104 | 2000 | A |
| Ref. Ex. 1 | — | B |

It was found through comparisons between Working Examples and Reference Example that the frequency of chipping decreases when glass plates provided with a side wall surface having a radius of curvature Rt of 2000 µm or less are produced. If an edge surface of a glass plate is chipped, the machining allowance for the subsequent edge surface polishing needs to be increased, and the number of defective products may increase, for example. Therefore, chipping is not preferable from the viewpoint of production efficiency.

Experiment Example 2-2

The above edge surface grinding was performed under the same conditions (Working Examples 105 to 108) as those for Experiment Example 2-1 and Working Examples 101 to 104 shown in Table 2, except that the shape of a formed grindstone was changed such that, with regard to the target shape of a chamfered surface of a glass plate obtained after being subjected to edge surface grinding, the boundary portion between a side wall surface and the chamfered surface had a radius of curvature of 150 to 400 µm. It was then found that the frequency of chipping decreased to 90% or less of that of the corresponding working example.

As described above, although a magnetic-disk substrate, a magnetic disk, an annular substrate, and a method for manufacturing a magnetic-disk substrate according to the present invention have been described in detail, the present invention is not limited to the above-described embodiments and working examples, and it will be appreciated that various improvements and modifications can be made without departing from the gist of the present invention.

The invention claimed is:

1. A magnetic-disk substrate comprising:
two main surfaces; and
an outer circumferential edge surface,
wherein the outer circumferential edge surface includes two chamfered surfaces that are respectively connected to the main surfaces, and a side wall surface that extends between the two chamfered surfaces,
the side wall surface is a curved surface that protrudes outward,
the side wall surface has a radius of curvature of 1100 µm or more on a cross-section of the magnetic-disk substrate extending along a plate thickness direction of the magnetic-disk substrate, and
the magnetic-disk substrate has a plate thickness of less than 0.6 mm.

2. The magnetic-disk substrate according to claim 1, wherein the side wall surface has a radius of curvature of 2000 µm or less.

3. The magnetic-disk substrate according to claim 1, wherein a length in a direction parallel to the main surface between a connection position at which the chamfered surface is connected to the main surface and a position at which the side wall surface protrudes most outward is 100 µm or less.

4. The magnetic-disk substrate according to claim 1,
wherein the chamfered surface is curved to protrude outward, and
the chamfered surface has a radius of curvature that is smaller than the radius of curvature of the side wall surface, on a cross-section of the magnetic-disk substrate extending along the plate thickness direction of the magnetic-disk substrate.

5. The magnetic-disk substrate according to claim 4,
wherein the chamfered surface has a radius of curvature of 100 to 1000 μm.

6. The magnetic-disk substrate according to claim 1,
wherein a connection region of the chamfered surface located on the connection position side where the chamfered surface is connected to the main surface is inclined at an angle of 30 to 70 degrees with respect to a direction parallel to the main surface, on a cross-section of the magnetic-disk substrate extending along the plate thickness direction of the magnetic-disk substrate.

7. The magnetic-disk substrate according to claim 1,
wherein a boundary portion between the chamfered surface and the side wall surface is rounded on a cross-section of the magnetic-disk substrate extending along the plate thickness direction of the magnetic-disk substrate.

8. The magnetic-disk substrate according to claim 1,
wherein the magnetic-disk substrate is a glass substrate.

9. A magnetic disk comprising
at least a magnetic film on a surface of the magnetic-disk substrate according to claim 1.

10. An annular substrate comprising:
two main surfaces;
an outer circumferential edge surface; and
an inner circumferential edge surface,
wherein the outer circumferential edge surface includes two chamfered surfaces that are respectively connected to the main surfaces, and a side wall surface that extends between the two chamfered surfaces,
the side wall surface is a curved surface that protrudes outward,
the side wall surface has a radius of curvature of 1100 μm or more on a cross-section of the annular substrate extending along a plate thickness direction of the annular substrate, and
the magnetic-disk substrate has a plate thickness of less than 0.6 mm.

11. A method for manufacturing a magnetic-disk substrate, comprising
processing for polishing at least a main surface of the annular substrate according to claim 10.

12. The magnetic-disk substrate according to claim 2,
wherein a length in a direction parallel to the main surface between a connection position at which the chamfered surface is connected to the main surface and a position at which the side wall surface protrudes most outward is 100 μm or less.

13. The magnetic-disk substrate according to claim 2,
wherein the magnetic-disk substrate is a glass substrate.

14. The magnetic-disk substrate according to claim 3,
wherein the magnetic-disk substrate is a glass substrate.

15. The magnetic-disk substrate according to claim 4,
wherein the magnetic-disk substrate is a glass substrate.

16. The magnetic-disk substrate according to claim 5,
wherein the magnetic-disk substrate is a glass substrate.

17. The magnetic-disk substrate according to claim 6,
wherein the magnetic-disk substrate is a glass substrate.

18. The magnetic-disk substrate according to claim 7,
wherein the magnetic-disk substrate is a glass substrate.

* * * * *